3,580,846
FERROELECTRIC CERAMIC MATERIALS
Chiyoshi Okuyama, 2-14 Nishiki-cho, and Syuzo Osumi, 1-15 Hikari-cho, both of Fujinomiya-shi, Shizuoka-ken, Japan
Filed Nov. 10, 1969, Ser. No. 875,368
Int. Cl. C04b 35/46, 35/48
U.S. Cl. 252—62.9
4 Claims

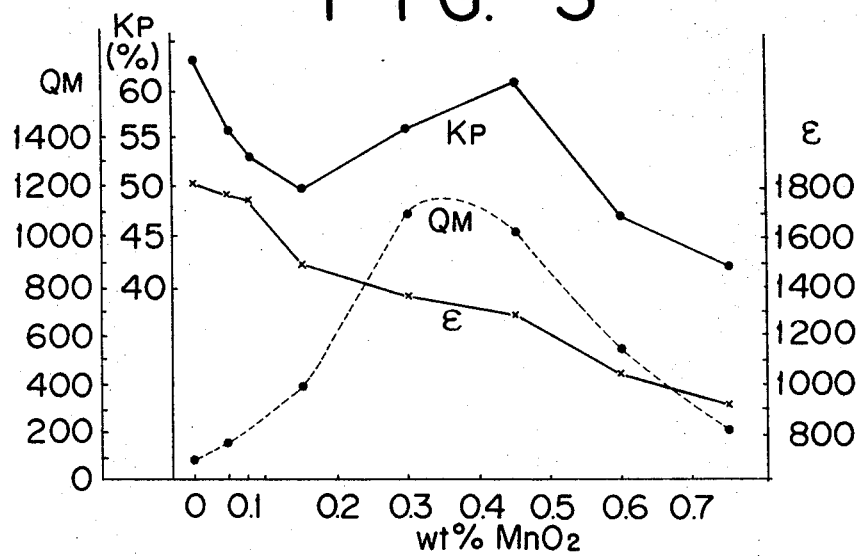
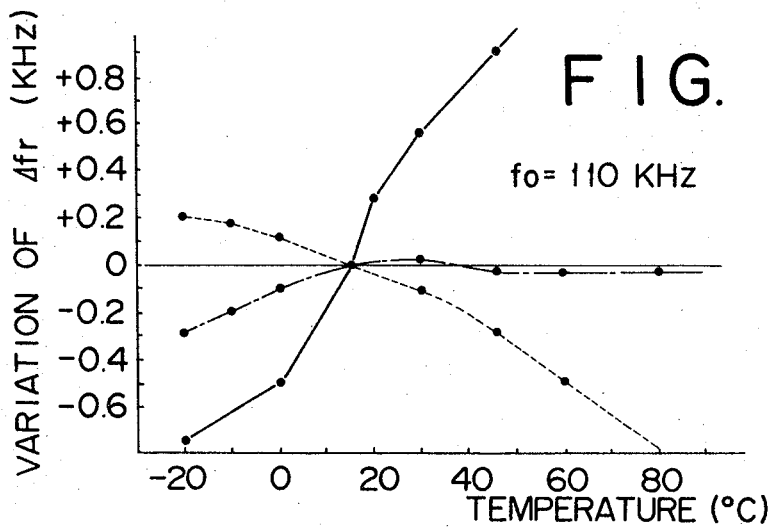
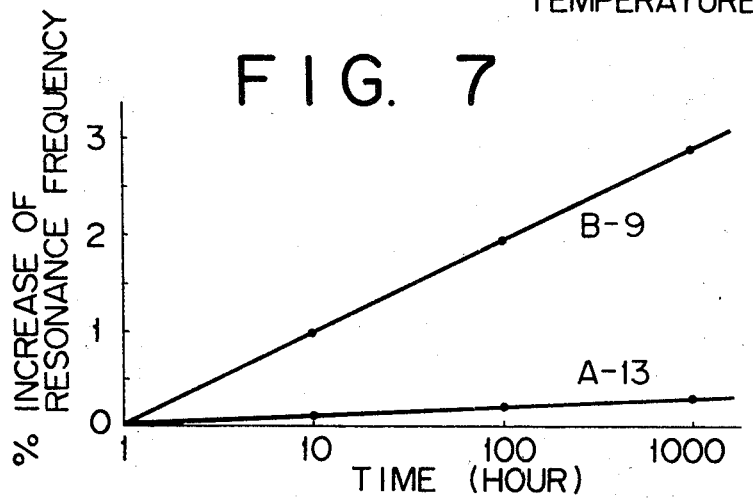

ABSTRACT OF THE DISCLOSURE

Ferroelectric ceramic materials having essentially the composition $Pb(Zr-Ti)O_3$ or $Pb(Zr-Ti-Sn)O_3$ and containing Bi and Nb in small percentage exhibit improved coupling coefficients. As modifications, the materials may also contain Mn in small percentage and part of the Pb may be replaced by Ba, Sr or both. The materials are particularly useful as ceramic wave filters and piezoelectric voltage sources.

---

The present invention relates to ferroelectric ceramic materials useful as a ceramic filter or piezoelectric voltage source and more particularly to ferroelectric ceramic materials improved in mechanical Q, electromechanical coupling coefficient and dielectric loss.

The known types of ferroelectric ceramic materials include those mainly consisting of lead titanate and lead zirconate which may be expressed by the general formula:

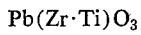
$$Pb(Zr \cdot Ti)O_3$$

those prepared by replacing part of the lead with strontium and/or barium which may be represented by the general formulae:

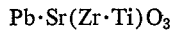
$$Pb \cdot Sr(Zr \cdot Ti)O_3$$

or

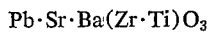
$$Pb \cdot Sr \cdot Ba(Zr \cdot Ti)O_3$$

There are also known other types of ceramic materials wherein there are incorporated in the aforementioned basic components various additives, for example, metal oxides in order to improve the electrical properties of said ceramic materials such as electromechanical coupling coefficient $Kp$ and dielectric constant $\epsilon$. However, the prior are ceramic materials failed to meet requirements for $Kp$ and $\epsilon$, no matter what kind of additives were contained.

The present invention provides new ceramic materials that can display a more desirable values of coupling coefficient $Kp$ and dielectric constant $\epsilon$ than the known types similarly containing lead zirconate and lead titanate.

The ceramic material of the present invention may include 0.04 to 1.0 percent by weight of manganese as equivalent to $MnO_2$. When incorporated with manganese, the ceramic material retains the elevated degree of $Kp$ attained by addition of bismuth and niobium and exhibits a prominently high level of $Q_M$.

This invention can be more fully understood from the following detailed description when taken in connection with reference to the accompanying drawings, in which.

Figure 4:
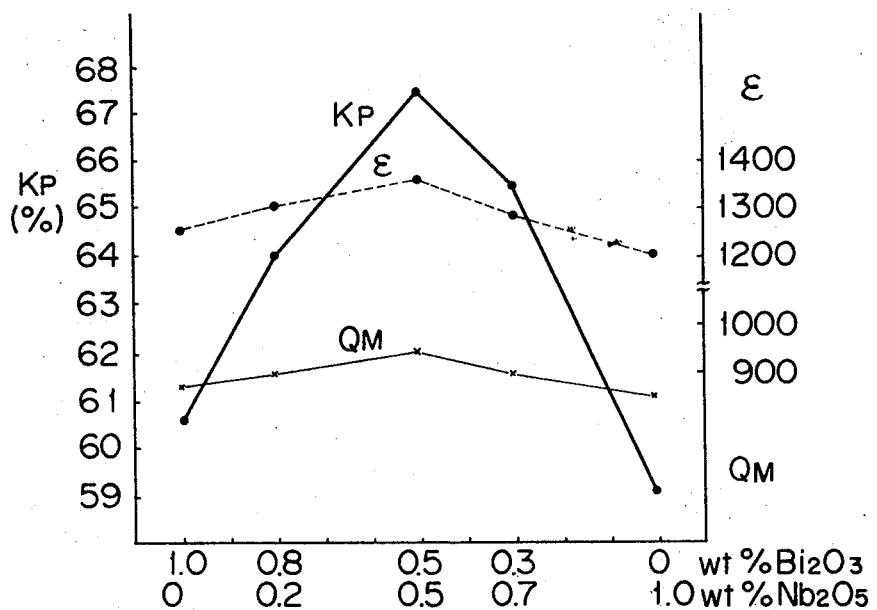
Figure 5:
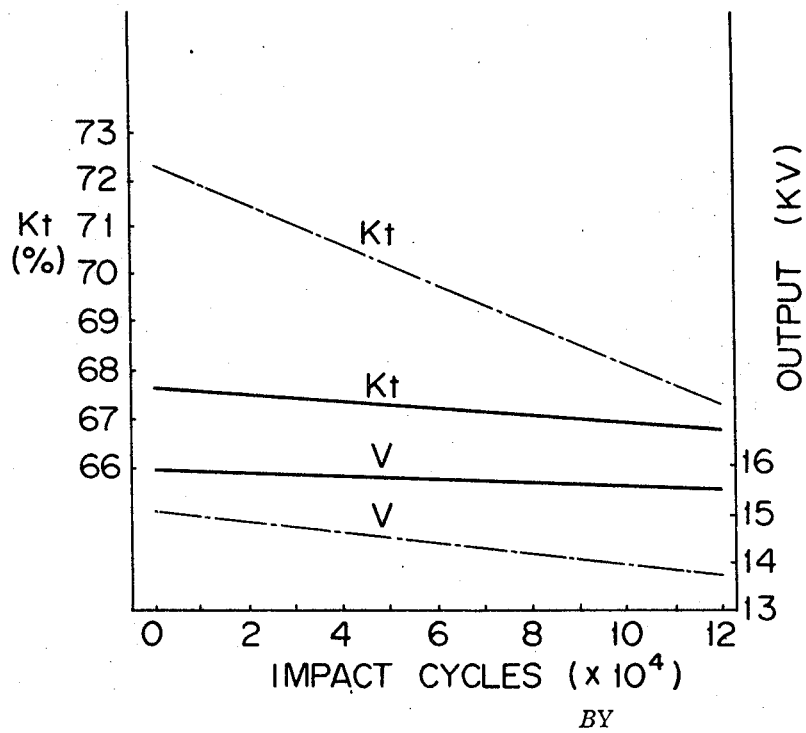

FIG. 3 graphically represents the varied properties of the present ferroelectric ceramic material corresponding to the varied content of $MnO_2$;

FIG. 4 graphically indicates the varied properties of the present ferroelectric ceramic material containing $MnO_2$ where the ratio of $Bi_2O_3$ to $Nb_2O_5$ contained therein is varied;

FIG. 5 is a graph showing changes in coupling coefficient and output voltage of the present ferroelectric ceramic material corresponding to the number of impacts applied thereto in comparison with those of the prior art ceramic material;

FIG. 6 is a graph illustrating changes in the resonance frequency of the present ferroelectric ceramic material corresponding to its temperature in comparison with those of the prior art ceramic material; and FIG. 7 is a graph indicating changes in the resonance frequency of the present ferroelectric ceramic material corresponding to a length of time after polarization in comparison with those of prior art ceramic material.

The basic component applicable to the present invention has essentially the same composition as the known lead titanate-lead zirconate type. Less than 20 atomic percent of the lead maybe replaced by strontium and/or barium, and also less than 20 atomic percent of the zirconium may be substituted by tin.

The ceramic material of the present invention may be prepared in the following manner. There are first mixed in a prescribed mol ratio lead oxide, zirconium oxide and titanium oxide, and strontium oxide, barium oxide and tin oxide used if required and additives such as bismuth oxide, niobium oxide and manganese dioxide. While said mixing may be conducted either by the wet or dry process, it is preferred for fully uniform mixing to continue said mixing in a ball mill or the like for a relatively long time, say, about 5 to 10 hours. Generally, it is preferable that the lead oxide is used about 0.1 mol percent in excess of the desired ratio in order to compensate the loss caused by its evaporation on sintering. If ground in advance by the wet process, the mixture is dried and ground again and there is added thereto a suitable amount of binder. Then the mass is formed into a desired shape at a relatively low pressure of about 1 ton/cm.² The shaped body is preliminarily baked in an adequate oven such as a tunnel furnace at a relatively low temperature of, for example, 900° to 1100° C. The mass is further pulverized into suitable particle sizes of, for example, less than 20 microns, using again a ball mill or vibration mill. To the powder obtained is again added a suitable amount of binder. The mass is formed into a desired shape at a pressure of 2 to 3 ton/cm.² and sintered at a temperature of 1240° to 1340° C. The sintered body is lapped, if required, until both sides thereof attain a prescribed degree of parallelism and flatness. To each lapped plane is fitted a silver electrode by suitable means, for example, baking. This element is polarized in an insulating liquid such as silicone oil by impressing across the electrodes such as a voltage as to obtain a D.C. field strength of, for example, about 3 to 4 kv./mm. at normal temperature or at around 100° C.

It has been discovered that addition of bismuth and niobium to the ferroelectric ceramic material of the present invention elevates its $Kp$. Experiments show that a ferroelectric ceramic material prepared by adding to the aforesaid basic component 0.2 to 3.0 percent by weight of bismuth as equivalent to $Bi_2O_3$ and 0.2 to 3.0 percent by weight of niobium as equivalent to $Nb_2O_5$ increased the $Kp$ inherent to the basic component by about 20 percent or more.

Figure 1:
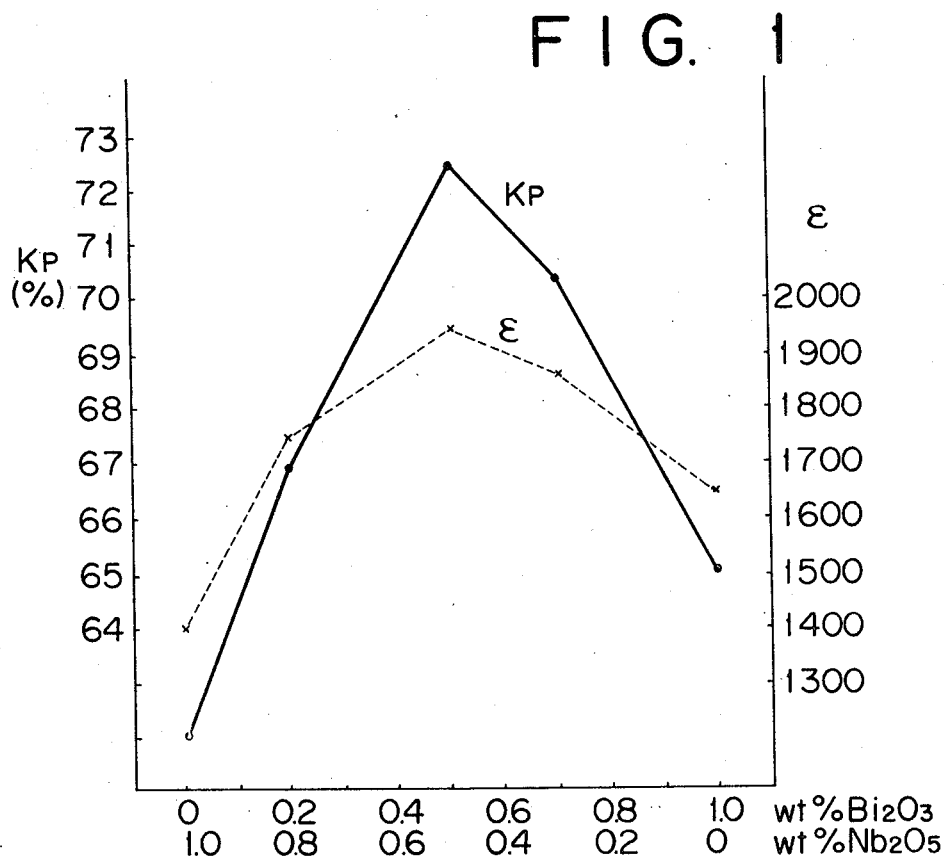
FIG. 1 is a graph showing changes in the $Kp$ and $\epsilon$ of a ferroelectric ceramic material according to the present invention where the ratio of $Bi_2O_3$ to $Nb_2O_5$ contained therein is varied.

While the ratio of bismuth to niobium affects to a certain extent the improvement of the $Kp$ of the resultant ceramic material, an optimum ratio is mainly defined by the composition of the basic component. FIG. 1 shows changes in the $Kp$ and $\epsilon$ of several kinds of ceramic materials prepared by adding to the basic component having a composition expressed by the following chemical formula $$Pb_{0.93}Sr_{0.05}Ba_{0.02}(Zr_{0.54}Ti_{0.46})O_3$$

Figure 2:
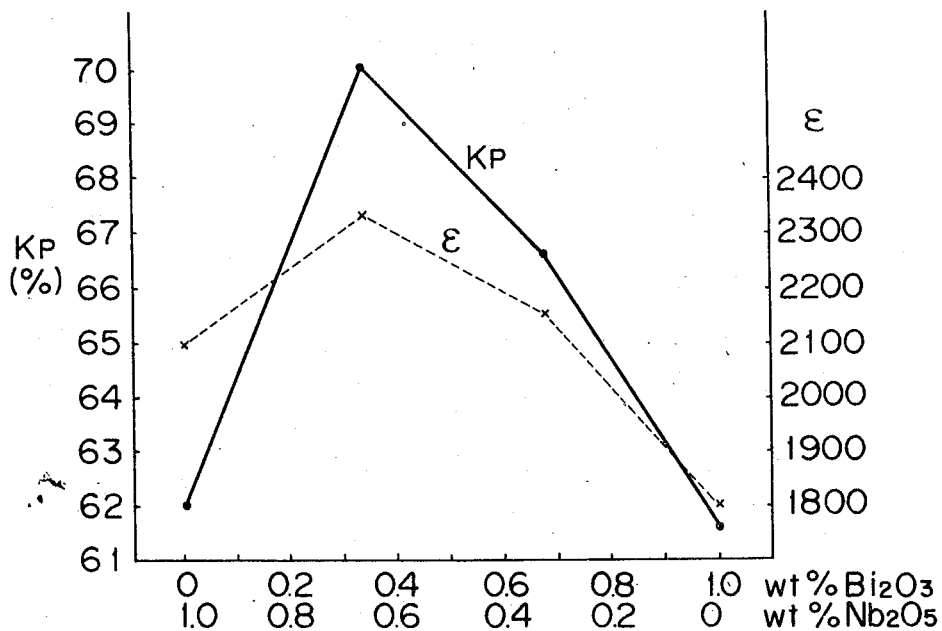
FIG. 2 is a graph indicating changes in the $Kp$ and $\epsilon$ of another ferroelectric material according to the present invention prepared from a different kind of basic component from that of FIG. 1 where the ratio of $Bi_2O_3$ to $Nb_2O_5$ contained therein is varied.

$Bi_2O_3$ and $Nb_2O_5$ in various ratios in such a manner that the total content of both additives always accounts for 1 percent by weight on the basis of the basic component. It will be apparent from this figure that a maximum $Kp$ is realized by a ceramic material prepared by adding $Bi_2O_3$ and $Nb_2O_5$ in an equal weight ratio. FIG. 2 represents changes in the $Kp$ and $\epsilon$ of several kinds of ceramic materials prepared by adding to the basic component having a composition represented by the following chemical formula $$Pb_{0.85}Sr_{0.03}Ba_{0.12}(Zr_{0.535}Ti_{0.465})O_3$$

$Bi_2O_3$ and $Nb_2O_5$ in various ratios in such a manner that the total content of both additives always accounts for 1 percent by weight on the basis of the basic component. In this case, as shown in FIG. 2, a ceramic material containing about 0.3 percent by weight of $Bi_2O_3$ and about 0.7 percent by weight of $Nb_2O_5$ has a maximum $Kp$.

FIG. 3 indicates the effect on $Kp$, $Q_M$ and $\epsilon$ of manganese when it is added to the ferroelectric ceramic material of the present invention. The data given in FIG. 3 were obtained from various samples prepared by adding 1.0 percent by weight of $Bi_2O_3$ and 0.5 percent by weight of $Nb_2O_5$ to a basic component having a composition represented by a chemical formula $$Pb_{0.95}Sr_{0.05}(Zr_{0.53}Ti_{0.47})O_3$$

with only $MnO_2$ added in varying amounts. Each sample was formed by the aforementioned process into a disc 20 mm. in diameter and 0.5 mm. thick. As seen from FIG. 3, increased addition of $MnO_2$ did not widely vary $Kp$, whereas $Q_M$ indicated a high value of about 1200 when said addition amounted to about 0.35 percent by weight. With respect to improvement of $Q_M$, it has been found that addition of less than about 0.05 percent by weight of $MnO_2$ did not have a prominent effect, and conversely addition of more than 1 percent by weight of $MnO_2$ considerably reduced such effect.

FIG. 4 illustrates changes in the $Kp$, $\epsilon$ and $Q_M$ of several samples prepared by adding to the aforesaid basic component 0.4 percent by weight of $MnO_2$ and further $Bi_2O_3$ and $Nb_2O_5$ in various ratios in such a manner that the total content of both additives always accounted for 1 percent by weight on the basis of the basic composition.

The ceramic material of the present invention containing bismuth, niobium and manganese has the advantage that is generates a high output voltage when used as a piezoelectric voltage source element, and that even after it is subjected to impacts a large number of times, its original impact resistance is little reduced. Further advantages of this ceramic material are that its resonance frequency is extremely stable with respect to temperature changes and a lapse of time after polarization. This obviously proves that the ceramic material of the present invention has excellent properties as a ceramic wave filter.

Features and further advantages of the present invention will be more clearly understood from the following examples. Throughout the examples, percent denotes percent by weight.

EXAMPLE 1

There were prepared two samples and four reference samples listed in Table 1 below by mixing the oxides of the elements given therein in a prescribed ratio, followed by shaping and sintering. Each sample and reference sample was prepared by grinding and mixing the powdered oxides in a ball mill for about 10 hours. A mass formed into a desired shape after addition of a suitable amount of binder was preliminarily baked at a temperature of about 1000° C. and pulverized again in a ball mill. After addition of a suitable amount of binder a second time, the powder obtained was shaped into a disc 20 mm. in diameter and 0.5 mm. thick at a pressure of about 3 ton/cm.². Each sample was finished by being sintered for about an hour at a temperature of about 1300° C. The sample was lapped on both sides before its properties were determined. After washing, each lapped plane was fitted with a silver electrode by baking. The sample was polarized in a silicone oil at about 100° C. by impressing across both electrodes such a D.C. voltage as to generate a D.C. field strength of 4 kv./mm. therein. It will be noted that throughout this and following examples, the samples having a composition specified by the present invention are designated as A and those outside of its scope as B.

TABLE 1

| Sample | Composition | Kp (percent) | $\epsilon$ |
|---|---|---|---|
| A-1 | $Pb(Zr_{0.38}Ti_{0.47}Sn_{0.15})O_3 + 1.0$ $Bi_2O_3 + 0.5\%$ $Nb_2O_5$. | 61 | 1,400 |
| A-2 | $Pb_{0.82}Ba_{0.18}(Zr_{0.54}Ti_{0.46})O_3 + 0.5\%$ $Bi_2O_3 + 0.5\%$ $Nb_2O_5$. | 68 | 2,300 |
| A-3 | $Pb_{0.85}Ba_{0.12}Sr_{0.03}(Zr_{0.535}Ti_{0.465})O_3 + 0.67\%$ $Bi_2O_3 + 0.33\% Nb_2O_5$. | 66.7 | 2,150 |
| A-4 | $Pb_{0.85}Ba_{0.12}Sr_{0.03}(Zr_{0.535}Ti_{0.465})O_3 + 0.33\%$ $Bi_2O_3 + 0.67\%$ $Nb_2O_5$. | 70.0 | 2,350 |
| B-1 | $Pb_{0.85}Ba_{0.12}Sr_{0.03}(Zr_{0.535}Ti_{0.465})O_3 + 1.0\%$ $Bi_2O_3$. | 61.5 | 1,800 |
| B-2 | $Pb_{0.85}Ba_{0.12}Sr_{0.03}(Zr_{0.535}Ti_{0.465})O_3 + 1.0\%$ $Nb_2O_5$. | 62.5 | 2,100 |

As apparent from Table 1 above, addition of both bismuth and niobium is recognized to have a more prominent effect on the elevation of $Kp$ than in the case where they are use singly.

EXAMPLE 2

There were prepared samples having such compositions as shown in Table 2 below under the same conditions as in Example 1.

TABLE 2

| Sample | Composition | Kp (percent) | $\epsilon$ | tan $\delta$ | $Q_M$ |
|---|---|---|---|---|---|
| A-5 | $Pb_{0.95}Sr_{0.05}(Zr_{0.53}Ti_{0.47})O_3 + 1\%$ $Bi_2O_3 + 0.5\%$ $Nb_2O_5 + 0.45\%$ $MnO_2$ | 63 | 1,300 | 0.5 | 950 |
| A-6 | $Pb_{0.93}Sr_{0.05}Ba_{0.02}(Zr_{0.54}Ti_{0.46})O_3 + 0.5\%$ $Bi_2O_3 + 0.5\% Nb_2O_5 + 0.4\%$ $MnO_2$ | 67 | 1,250 | 0.5 | 1,000 |
| B-3 | $Pb(Zr_{0.53}Ti_{0.47})O_3$ | 35 | 720 | 1.0 | 250 |
| B-4 | $Pb(Zr_{0.53}Ti_{0.47})O_3 + 0.45\%$ $MnO_2$ | 38 | 600 | 0.6 | 1,000 |
| B-5 | $Pb_{0.95}Sr_{0.05}(Zr_{0.53}Ti_{0.47})O_3$ | 41 | 1,020 | 1.0 | 350 |
| B-6 | $Pb_{0.95}Sr_{0.05}(Zr_{0.53}Ti_{0.47})O_3 + 1.0\%$ $Bi_2O_3 + 0.5\%$ $Nb_2O_5$ | 67 | 1,800 | 3.0 | 90 |

Table 2 above shows that the samples A-5 and A-6 having a composition within the scope of the present invention can display far higher degrees of $Kp$ and $Q_M$ than the reference samples. Addition of $MnO_2$ tends to decrease $\epsilon$ of the ceramic material. However, this is associated with the elevation of its output voltage and so may be considered very desirable.

EXAMPLE 3

There were prepared sample A-7 having composition $$Pb_{0.95}Sr_{0.05}(Zr_{0.54}Ti_{0.46})O_3 + 0.5\% \ Bi_2O_3 + 0.5\% \ Nb_2O_5 + 0.4\% \ MnO_2$$

and reference sample B-7 having the same composition as above except for the omission of $MnO_2$ in the same manner as in Example 1. Both samples A-7 and B-7 were formed into a rod 5 mm. in diameter and 10 mm. long and placed in a case made of plastics material. They were repeatedly subjected to impacts of a fixed strength to determine changes in the output voltage and coupling coefficient K$t$ in the direction of thickness corresponding to the number of impacts applied thereon, the results being presented in FIG. 5. The solid lines of this figure represent data on sample A-7 and the dot-dash lines those on sample B-7. As apparent from the figure, the output voltage of sample B-7 prominently decreased with the increaing number of impacts, whereas that of sample A-7 was reduced very little. Further, the K$t$ of sample B-7, though initially high, decreased to about 90 percent of its original value after receiving impacts 120,000 times, while the K$t$ of sample A-7 retained as high a value as corresponding to about 99 percent of its initial level, even after said sample was subjected to the same number of impacts.

EXAMPLE 4

There were prepared five samples listed in Table 3 below in the same manner as in Example 1. These samples had the same compositions excepting that the ratio of zirconium to titanium was varied. All the samples contained 1.0% $Bi_2O_3$, 0.5% $Nb_2O_5$ and 0.45% $MnO_2$.

TABLE 3

| Sample | Basic compostiion | Kp (percent) | ε | tan δ | Q$_M$ |
|---|---|---|---|---|---|
| A-8 | $Pb_{0.95}Sr_{0.05}(Zr_{0.47}Ti_{0.53})O_3$ | 39 | 680 | 0.7 | 1,750 |
| A-9 | $Pb_{0.95}Sr_{0.05}(Zr_{0.50}Ti_{0.50})O_3$ | 47 | 900 | 0.6 | 1,150 |
| A-10 | $Pb_{0.95}Sr_{0.05}(Zr_{0.53}Ti_{0.47})O_3$ | 62 | 1,300 | 0.6 | 900 |
| A-11 | $Pb_{0.95}Sr_{0.05}(Zr_{0.56}Ti_{0.44})O_3$ | 55 | 650 | 0.9 | 980 |
| A-12 | $Pb_{0.95}Sr_{0.05}(Zr_{0.59}Ti_{0.41})O_3$ | 45 | 500 | 3.0 | 1,050 |

The above table shows that though the varied ratio of Zr to Ti resulted in certain differences in the properties of a ceramic material, samples A-4 to A-8 all displayed a high degree of K$p$ and Q$_M$.

EXAMPLE 5

There was prepared in the same manner as in Example 1 sample A-13 having a composition

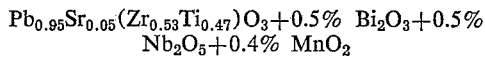

$Pb_{0.95}Sr_{0.05}(Zr_{0.53}Ti_{0.47})O_3 + 0.5\%\ Bi_2O_3 + 0.5\%\ Nb_2O_5 + 0.4\%\ MnO_2$

The sample was tested to determine changes in the resonance frequency ($f_0 = 110$ kHz.) corresponding to its temperature, the results being given in FIG. 6. For comparison the figure also indicates the property associated with temperature change as exhibited by sample B-8 having a composition

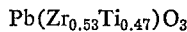

$Pb(Zr_{0.53}Ti_{0.47})O_3$ and sample B-9 having a composition $Pb(Zr_{0.53}Ti_{0.47})O_3 + 0.45\ MnO_2$ As apparent from FIG. 6, sample A-13 represented by a dot-dash line has a preferable nature that its resonance frequency is little affected by temperature.

Further in FIG. 7 there are represented changes in the resonance frequency of samples A-13 and B-8 corresponding to a lapse of time after polarization. The figure shows that sample A-13 retained substantially the same resonance frequency as right after polarization even when long hours have passed thereafter.

What we claim is:

1. A ferroelectric ceramic material having a composition consisting essentially of a basic component of lead zirconate and lead titanate in a mol ratio of 60:40 to 45:55 respectively and 0.2 to 3.0 percent by weight of bismuth on the basis of said basic component as equivalent to $Bi_2O_3$ and 0.2 to 3.0 percent by weight of niobium on the same basis as equivalent to $Nb_2O_5$.

2. A ferroelectric ceramic material according to claim 1 wherein less than 20 atomic percent of the lead is replaced by at least one element selected from the group consisting of barium and strontium.

3. A ferroelectric ceramic material according to claim 1 wherein less than 20 atomic percent of the zirconium is replaced by tin.

4. A ferroelectric ceramic material according to claim 1 wherein said composition further contains 0.04 to 1.0 percent by weight of manganese on the basis of said basic component as equivalent to $MnO_2$.

References Cited

UNITED STATES PATENTS

| 2,911,370 | 11/1959 | Kulcsar | 252—62.9 |
| 3,117,094 | 1/1964 | Roup et al. | 253—62.9 |
| 3,464,924 | 9/1969 | Banno et al. | 252—62.9 |

TOBIAS E. LEVOW, Primary Examiner

J. COOPER, Assistant Examiner

U.S. Cl. X.R.

106—39R